United States Patent
Uchida et al.

(12)

(10) Patent No.: US 6,304,047 B1
(45) Date of Patent: Oct. 16, 2001

(54) WIPER MOTOR CONTROL APPARATUS

(75) Inventors: Yasuaki Uchida, Kosai; Masahi Nakata, Toyohashi, both of (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/536,400

(22) Filed: Mar. 28, 2000

(30) Foreign Application Priority Data

May 20, 1999 (JP) .................................................. 11-139790
Dec. 3, 1999 (JP) .................................................. 11-344814

(51) Int. Cl.[7] .................................................. G05B 5/00
(52) U.S. Cl. ............................ 318/445; 318/DIG. 2; 15/250.12
(58) Field of Search .................................... 318/443, 445, 318/446, 466, 468, 282, 286, DIG. 2; 15/250.12, 250.17

(56) References Cited

U.S. PATENT DOCUMENTS

| | | | |
|---|---|---|---|
| 3,611,094 | * 10/1971 | Bischoff | 318/305 |
| 4,285,089 | * 8/1981 | Takahashi et al. | 15/250.2 |
| 4,459,518 | * 7/1984 | Chevallier | 318/286 |
| 4,488,071 | * 12/1984 | Lane | 310/68 B |
| 4,599,546 | * 7/1986 | Uemura | 318/443 |
| 4,692,677 | * 9/1987 | Bauer et al. | 318/443 |
| 4,742,280 | * 5/1988 | Ishikawa et al. | 318/282 |
| 5,630,009 | * 5/1997 | Hayden | 388/838 |
| 5,786,675 | * 7/1998 | Niki et al. | 318/466 |
| 5,998,949 | * 12/1999 | Amagasa | 318/280 |

FOREIGN PATENT DOCUMENTS

| | | |
|---|---|---|
| 2052099 | * 1/1981 | (DE) . |
| 0398630 | * 11/1990 | (EP) . |
| 59-11809 | 4/1984 | (JP) . |

\* cited by examiner

Primary Examiner—Robert E. Nappi
Assistant Examiner—Rina I. Duda
(74) Attorney, Agent, or Firm—Law Offices of David G. Posz

(57) ABSTRACT

A motor control apparatus for a motor having a plurality of operation modes includes a rotary wheel rotatable with the motor, a rotary switch for turning on or off according to rotation of motor rotary wheel, a first circuit including the rotary switch for supplying electric power to the motor via the rotary switch, a second circuit for supplying electric power separately, an operator switch for operating one of motor first and second circuits, and means for reducing electric potential thereof when operator switch operates motor second circuit. The first circuit and the second circuit are connected to the motor separately from each other, and the means is connected to the rotary switch.

29 Claims, 7 Drawing Sheets

$V_A=0V$, $+B=13.5V$

WIPER MOTOR CONTROL APPARATUS

CROSS REFERENCE TO RELATED APPLICATION

The present application is based on and claims priority from Japanese Patent Application Hei 11-139790, filed May 20, 1999, and Hei 11-344814, filed Dec. 3, 1999, the contents of which are incorporated herein by reference.

BACKGROUND OF THE INVENTION

1. Field of the Invention

The present invention relates to a motor control apparatus for a wiper motor. The motor control apparatus includes a switch mechanism for carrying out switching operation in cooperation with an output shaft of the motor.

2. Description of the Related Art

In a wiper control apparatus for a vehicle, when a driver turns off a operator switch, wiper blades move to a predetermined position wherever a position of the wiper blades are at that time because of an automatic stopping mechanism.

A wiper apparatus is usually constituted of a direct current motor and a speed reduction mechanism having an output shaft, a motor control apparatus having an operator switch for operating the motor and a link mechanism for converting rotational motion of the output shaft of the motor into swinging motion of wiper arms.

However, when the wiper apparatus is operated at a low speed or a high speed, an electromagnetic noise is generated from the motor control apparatus. For example, such noise includes a frequency range of 20 through 200 MHz, which may bring trouble on a radio set, a TV set or other electronic devices.

SUMMARY OF THE INVENTION

A main object of the present invention is to provide a motor control apparatus capable of restraining electromagnetic wave generated by a switch mechanism for controlling a motor when the motor is continuously operated.

It has been recognized that there are produced contact potential differences between a power feeding side and a rotary electrode and between the rotary electrode and a fixed terminal of the rotary switch. As switching operation is repeated, accumulation and discharge of electric charge are repeatedly carried out therebetween.

Therefore, another object of the present invention is to reduce or eliminate the electric potential difference in the rotary switch.

According to an aspect of the invention, the rotary switch is not applied with voltage of the battery while the motor is continuously operated, but is brought into the ground potential. Accordingly, the contact potential differences between the power-side terminal and the rotary electrode and between the rotary electrode and the switch-side terminal are restrained. Further, electric charge accumulated in the power-side terminal, the rotary electrode and switch-side terminal is reduced.

If the power-side terminal is connected to the battery or to the ground line, the battery voltage is prevented from being applied to the rotary switch when the motor is continuously operated. This can be attained by a switching relay.

The power-side terminal is connected by the switching relay to the ground line when the operator switch is shifted to a low speed wiping position or a high speed wiping position. While the motor is continuously operated, the power-side terminal, the rotary electrode and the switch-side terminal are brought into the ground potential and accordingly, the contact potential differences are eliminated, and electric charge is not accumulated.

According to another aspect of the invention, when the operator switch is shifted to the low speed position or the high speed position, the power-side terminal is connected to the low potential point formed by a voltage dividing circuit.

According to another aspect of the invention, the battery is connected to the ground line via a resistor even if the switching relay is short-circuited. Therefore, short-circuit of the battery can be prevented.

According to further aspect of the invention, a movable piece of the switching relay is fixed while it is operated. When the operator switch is brought into the OFF position, the battery is connected to the power-side terminal. Therefore, even if the switching relay fails in the operational state, the respective terminals and the rotary electrode of the rotary switch are connected to the low potential point.

According to another aspect of the present invention, a number of parts is not increased.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS (First Embodiment)

An explanation will be given of a first embodiment embodying the present invention in a motor control apparatus for a wiper apparatus in reference to FIG. 1 through FIG. 3 as follows.

Figure 1:
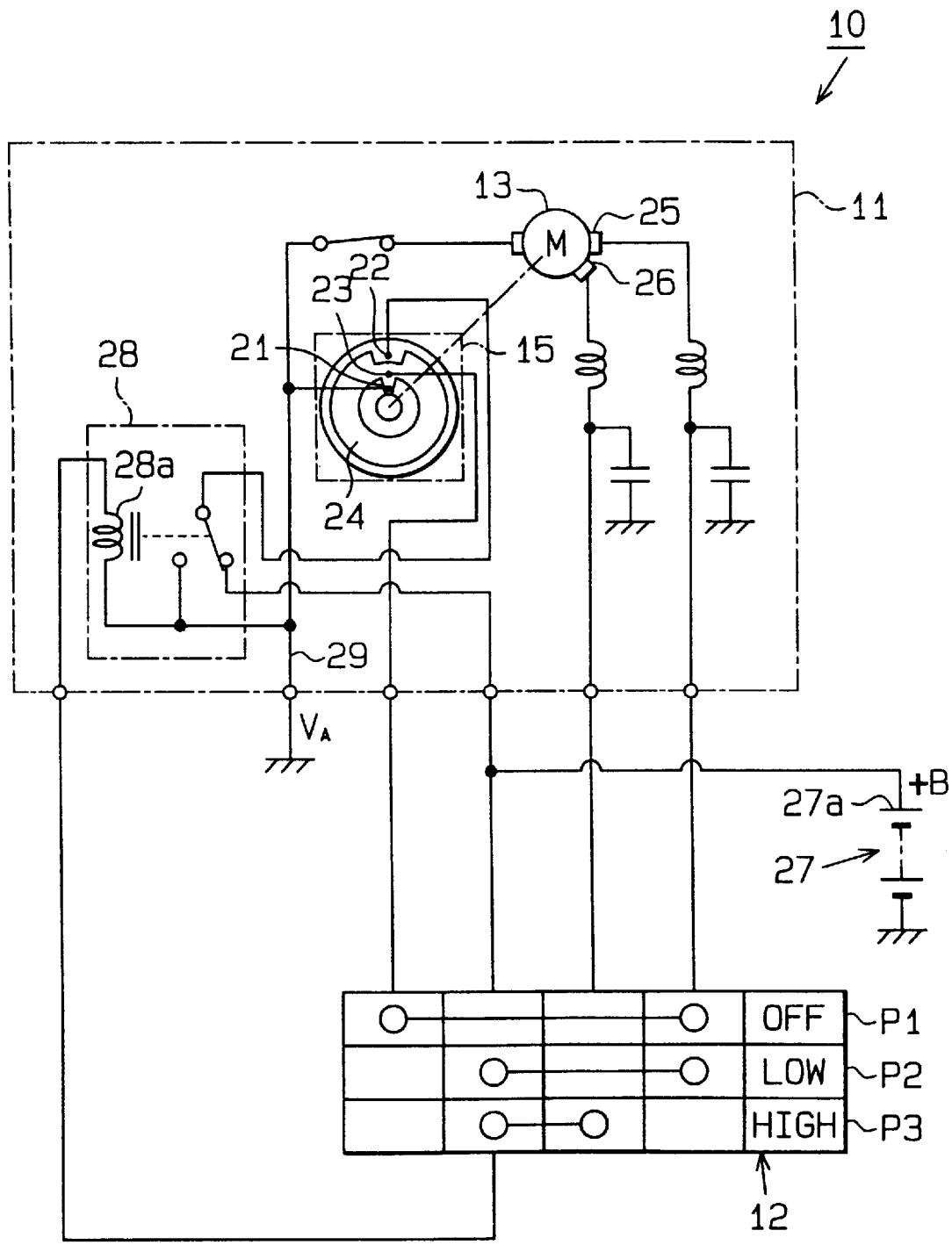
FIG. 1 is a circuit diagram of a motor control apparatus for a wiper motor according to a first embodiment.

As shown in FIG. 1, a motor control apparatus 10 for a wiper apparatus is constituted of a motor unit 11 for driving a well-known link mechanism (not shown) for operating to swing a wiper blade fixed to a wiper arm, and a wiper switch or an operator switch 12 provided at inside of a vehicular compartment and operated to switch by a driver.

The motor unit 11 is provided with a direct current motor 13, a worm gear 14 of a speed reduction mechanism, a rotary switch 15, and an output shaft 16 and so on.

Figure 2:
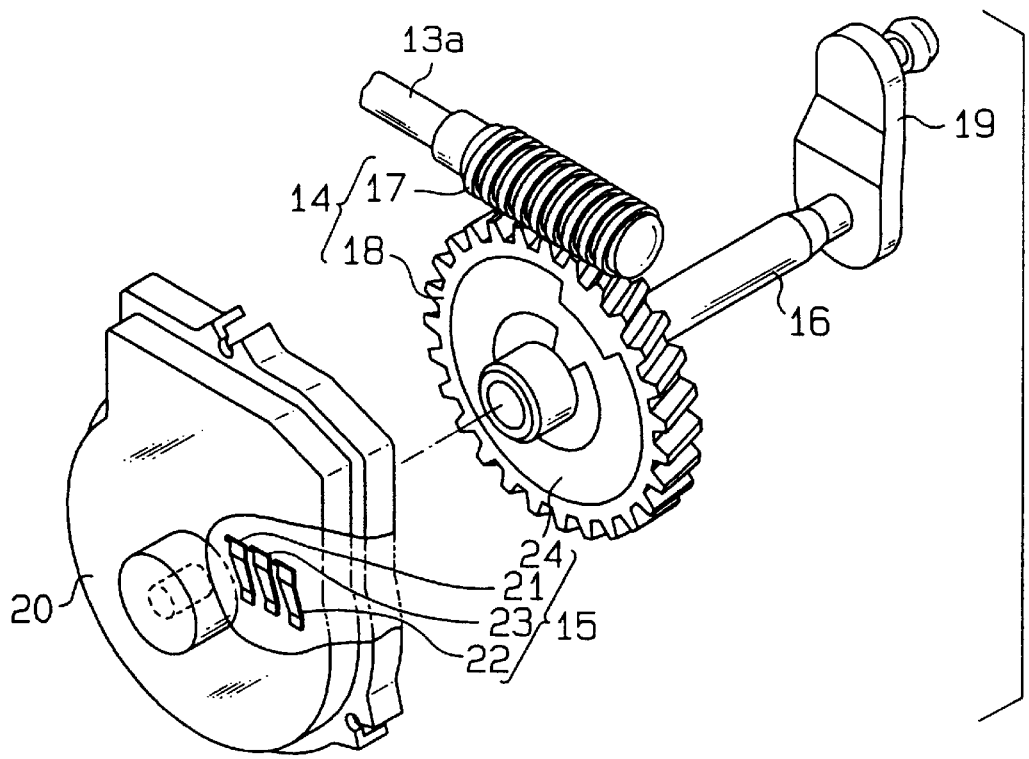
FIG. 2 is a schematically exploded perspective view illustrating reduction gear mechanism and a rotary switch.

As shown in FIG. 2, the worm gear 14 is constituted of a worm 17 fixed to an output shaft 13a of the motor 13 and a worm wheel 18 rotatably supported at inside of the housing in a state in mesh with the worm 17. The worm wheel 18 is fixed with the output shaft 16 such that a rotational axis of the output shaft 16 coincides with a center of rotation of the worm wheel 18. The output shaft 16 is fixed with the center of rotation of a crank 19 of the link mechanism.

As shown in FIG. 2, a lid member 20 constituting a portion of the housing is provided with a ground side fixed terminal 21 (hereinafter referred to as ground-side terminal) grounded to the housing via a ground line 29, a power-side terminal 22 (hereinafter referred to as power-side terminal) and a switch side fixed terminal 23 (hereinafter referred to as switch-side terminal) which are respectively disposed opposite the side face of the worm wheel 18.

A rotary electrode 24 is disposed on the side face of the worm wheel 18. The rotary electrode 24 is brought into sliding contact with the respective fixed terminals 21, 22 and 23 in accordance with the rotational motion of the worm wheel 18 for electrically switching to connect the switch-side terminal 23 to the ground-side terminal 21 or the power-side terminal 22 in accordance with a rotational position of the worm wheel 18.

As shown in FIG. 2, the rotary electrode 24 has an electricity conducting pattern for switching to connect the switch-side terminal 23 to the ground-side terminal 21 or the power-side terminal 22 with one rotational motion of the worm wheel 18, that is, the output shaft 16 as one period. The electricity conducting pattern is formed to cut power and connect the switch-side terminal 23 to the ground-side terminal 21 when the output shaft 16 is located at a predetermined rotational position, and to supply power when the output shaft 16 is located at a rotational position other than the predetermined rotational position. The one predetermined position of the output shaft 16 at which the switch-side terminal 23 is connected to the ground-side terminal 21, is provided in order to automatically stop the wiper blade at a lower end reverting position of a wiping range, that is, a stop position when operation of the motor unit 11 is stopped by the operator switch 12.

As shown in FIG. 1, the direct current motor 13 is provided with a brush 25 for low speed drive which is connected with a positive terminal 27a of a battery 27 as the power source when the direct current motor 13 is driven at a low speed and a brush 26 for high speed drive which is connected with the positive terminal 27a when the direct current motor 13 is driven at a high speed.

The operator switch 12 is respectively connected with the positive terminal 27a of the battery 27, the brush 25 for low speed drive and the brush 26 for high speed drive of the motor 13 and the switch-side terminal 23 of the rotary switch 15. The operator switch 12 can be operated to switch to any one of the OFF position P1 as a first position for stopping operation of the motor unit 11, the low speed operational position P2 as a second position for operating the wiper apparatus at a low speed and the high speed position as a third operational position for operating the wiper apparatus at a high speed. The operator switch 12 connects the switch-side terminal 23 to the brush 25 for low speed drive of the motor 13 at the OFF position P1. Further, the operator switch 12 connects the positive terminal 27a of the battery 27 directly to the brush 25 for low speed drive at the low speed position P2 and connects the positive terminal 27a of the battery 27 directly to the brush 26 for high speed drive.

According to the embodiment, at inside of the housing, there is provided a switching relay 28 as voltage control means and as switching means for preventing battery voltage from being applied to the rotary switch 15 when the operator switch 12 is shifted to the low speed position P2 or the high speed position P3.

The switching relay 28 is provided between the positive terminal 27a of the battery 27 and the power-side terminal 22 such that the switching relay 28 is operated by the operator switch 12 to switch connection as follows: if the operator switch 12 is located at the OFF position P1, the positive terminal 27a of the battery 27 is connected to the power-side terminal 22; if the operator switch is located at the low speed position P2 or the high speed position P3, the positive terminal 27a of the battery 27 is not connected to the power-side terminal 22 but the power-side terminal 22 is connected to the ground line 29.

The switching relay 28 is provided with an electromagnetic coil 28a which is operated by the battery 27 when the operator switch 12 is located at the low speed position P2 or the high speed position P3. The switching relay 28 connects the power-side terminal 22 to the positive terminal 27a of the battery 27 when the electromagnetic coil 28a is deenergized and connects the power-side terminal 22 to the ground line 29 when the electromagnetic coil is energized.

Further, when the operator switch 12 is shifted to the OFF position P1, a first circuit for driving the motor unit 11 is operated. The first circuit includes the rotary switch 15 and connects the motor unit 11 with the battery 27 so that power is fed to the motor 13 in a power supply state in which the switch-side terminal 23 of the rotary switch 15 is connected to the power-side terminal 22. The first circuit is cut in the power supply state when the switch-side terminal 23 is connected to the ground-side terminal 21. When the operator switch 12 is located at the low speed position P2 or the high speed position P3, a second circuit is operated. The second circuit connects the battery 27 with the motor 13 without interposing the rotary switch 15 therebetween.

If the operator switch 12 is located at the OFF position P1 where the positive terminal 27a of the battery 27 is connected to the power-side terminal 22 of the rotary switch 15 via the switching relay 28, the battery 27 is not connected to the motor 13 via the operator switch 12 when the switch-side terminal 23 of the rotary switch 15 is connected to the ground-side terminal 21 (power cut state). Therefore, the motor 13 is not operated to rotate, the worm wheel 18 is not operated to rotate and accordingly, the switch-side terminal 23 stays connected to the ground-side terminal 21. In other words, in the case the operator switch 12 is located at the OFF position P1 with the rotary switch 15 at the power cut state, the motor 18 stays still. That is, the wiper blade is not operated at the stop position.

When the operator switch 12 is shifted to the low speed position P2 or the high speed position P3, the battery 27 is connected directly to the brush 25 for low speed drive or the brush 26 for high speed drive of the motor 13 via the operator switch 12. As a result, the motor 13 is operated to rotate at a low speed or a high speed continuously in one direction.

At this occasion, by connecting the battery 27 to the electromagnetic coil 28a of the switching relay 28 via the operator switch 12 shifted to the low speed position P2 or the high speed position P3 and energizing the electromagnetic coil 28a, the power-side terminal 22 is not connected to the positive terminal 27a of the battery 27 but the power-side terminal 22 is connected to the ground line 29. When the motor 13 is operated to rotate continuously, power is supplied to the motor 13 not via the first circuit, that is, via the rotary switch 15 but via the operator switch 12 regardless of the connecting state of the rotary switch 15. When the second 25 circuit is operated, the power-side terminal 22, the rotary electrode 24 and the switch-side terminal 23 of the rotary switch 15 are not applied with battery voltage and brought into the ground potential.

When the operator switch 12 is shifted from the low speed position P2 or the high speed position P3 to the OFF position P1, the battery 27 is not connected to the electromagnetic coil 28a of the switching relay 28. Then, the electromagnetic coil 28a is deenergized and the battery 27 is connected to the power-side terminal 22 via the first circuit operated by the switching relay 28.

In the case in which the operator switch 12 is shifted from the low speed position P2 or the high speed position P3 to the OFF position P1, when the rotational position of the worm wheel 18 is located at a rotational position at which the switch-side terminal 23 of the rotary switch 15 is connected to the power-side terminal 22 thereof (power supply state), the first circuit including the switching relay 28, the rotary switch 15, the operator switch 12 and the brush 25 for low speed drive of the motor 13 is operated so that the battery 27 is connected to the motor 13 and the motor 13 is operated at a low speed. As a result, even when the operator switch 12 is shifted to the OFF position P1, the motor 13 is operated at a low speed to finally stop at a predetermined position.

In summary, when the worm wheel 18 is located at the rotational position at which the switch-side terminal 23 and the ground-side terminal 21 are connected in accordance with rotational operation of the motor 13, the battery 27 connected to the power-side terminal 22 via the switch relay 28, is not connected to the brush 25 for low speed drive of the motor 13 via the operator switch 12 (first circuit is cut). As a result, when the operator switch 12 is operated to switch from the low speed position P2 or the high speed position P3 to the OFF position P1, the motor 13 is operated to rotate until the worm wheel 18 reaches the predetermined rotational position at which the switch-side terminal 23 is connected to the ground-side terminal 21 and thereafter, the motor 13 is stopped at the rotational position.

Therefore, in the continuously operating state of the motor 13 in which the function of the rotary switch 15 is not needed, voltage of the battery 27 is not applied to the rotary switch 15 but the rotary switch 15 is brought into the ground potential and therefore, the contact potential differences between the power-side terminal 22 and the rotary electrode 24 and between the rotary electrode 24 and the switch-side terminal 23 which are brought into sliding contact with each other in accordance with the rotational motion of the worm wheel 18, are restrained, further, an amount of electric charge accumulated in the power-side terminal 22, the rotary electrode 24 and the switch-side terminal 23 is reduced.

Figure 3A:
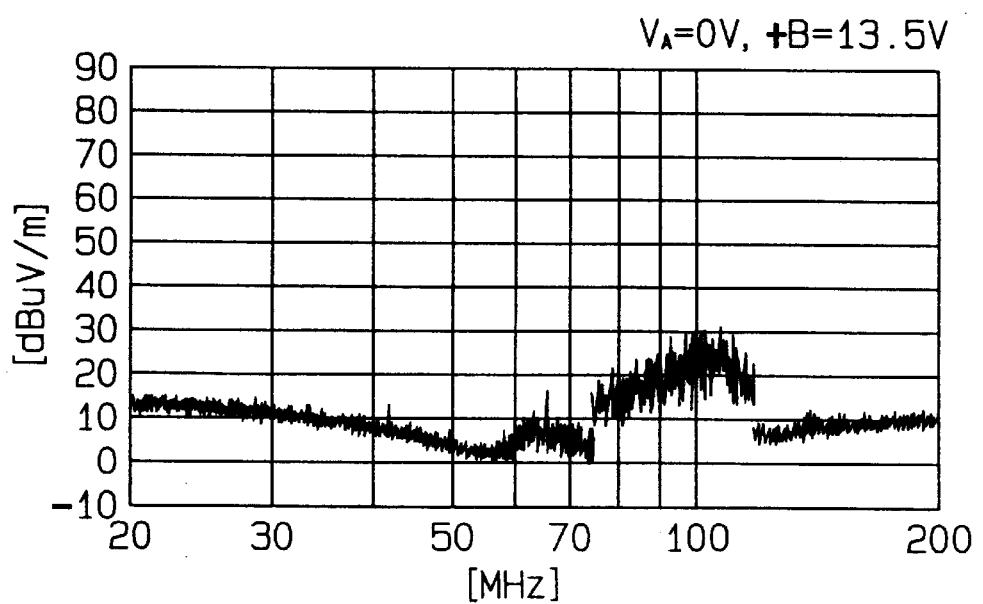
FIG. 3A is a graph showing an electric field intensity-frequency characteristic of the motor control apparatus according to a first embodiment.
Figure 3B:
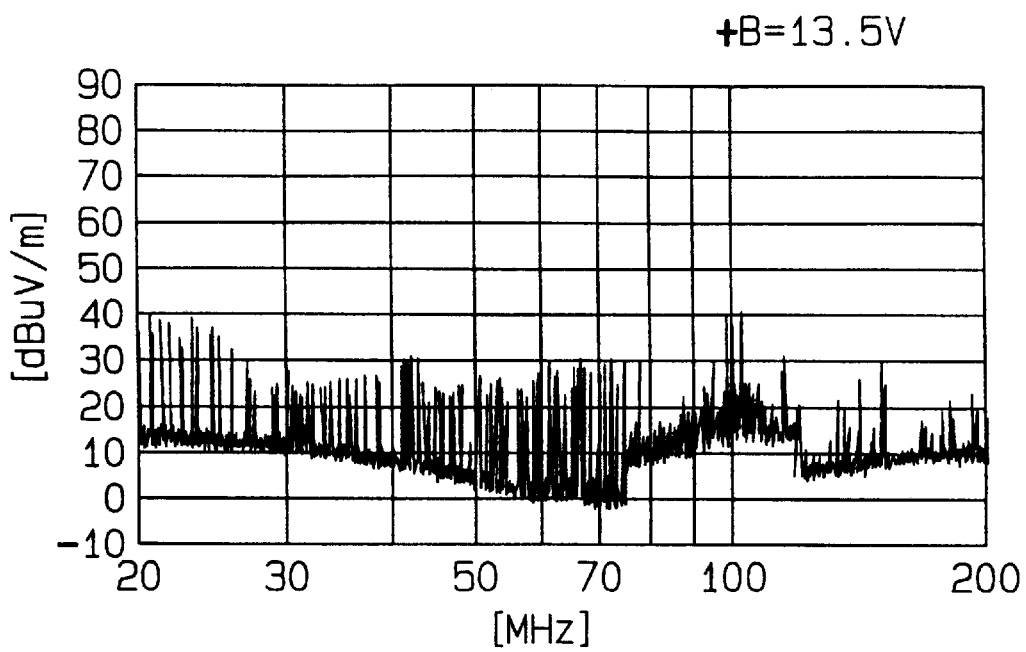
FIG. 3B is a graph showing an electric field intensity-frequency characteristic of the motor control apparatus of a conventional motor control apparatus.

FIG. 3A is a graph showing an electric field intensity-frequency characteristic of electromagnetic wave generated in operating the motor control apparatus 10 for the wiper apparatus according to the embodiment. The electric field intensity-frequency characteristic of the electromagnetic wave is measured under a condition in which 13.5 V is applied to the motor 13 as the battery voltage +B. As is known from the characteristic, in comparison with a case in which the battery voltage +B=13.5 V is applied to the rotary switch 15 as in the characteristic of the conventional motor control apparatus for the wiper apparatus shown in FIG. 3B, in the case in which the power-side terminal 22 is switched to potential VA=0 of the ground line 29, noise generated in the frequency range of 20 through 200 MHz is significantly reduced.

(Second Embodiment)

Next, an explanation will be given of a second embodiment embodying the present invention to a motor control apparatus for a wiper apparatus similar to the first embodiment in reference to FIG. 4 through FIG. 6. Further, the embodiment differs from the first embodiment only in that the switching relay 28 switches to connect the power-side terminal 22 to a voltage dividing circuit including resistors 30 and 31 instead of the ground line 29 as in the first embodiment. Therefore, the same notations are attached to constitutions the same as those in the first embodiment, an explanation thereof will be omitted and a description will be given only to the voltage dividing resistors 30 and 31 in details.

Figure 4:
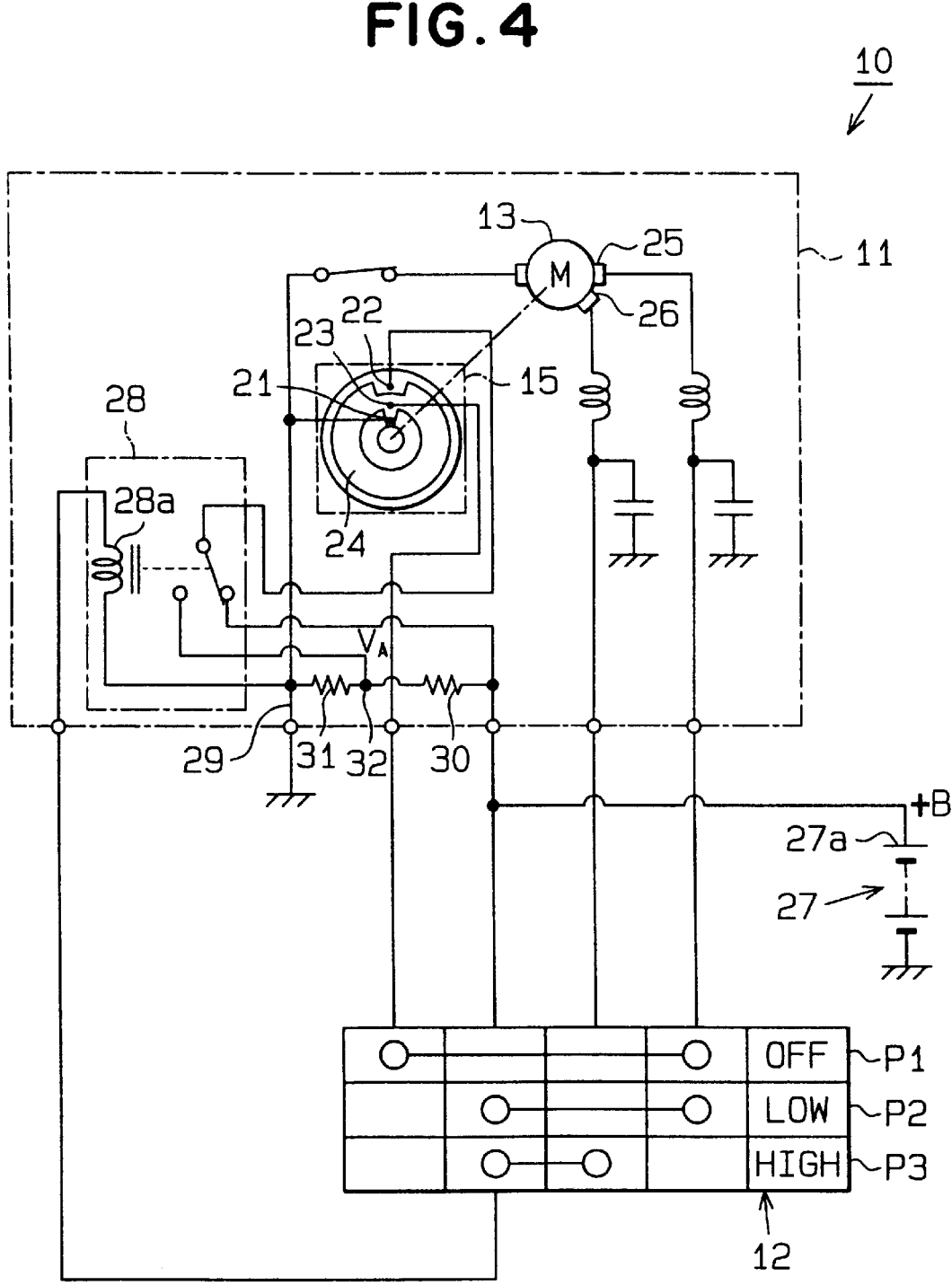
FIG. 4 is a circuit diagram of a motor apparatus for a wiper apparatus according to a second embodiment of the invention.

As shown in FIG. 4, the voltage dividing resistors 30 and 31 are connected between the positive terminal 27a of the battery 27 and the ground line 29. There is formed a low potential point 32 as a low potential portion produced by dividing the voltage of the battery 27 between the two resistors 30 and 31 by the voltage dividing resistors 30 and 31.

The switching relay 28 connects the positive terminal 27a of the battery 27 to the power-side terminal 22 when the operator switch 22 is located at the OFF position P1 and does not connect the battery 17 to the power-side terminal 22 but connects the power-side terminal 22 to the low potential point 32 in the case of the low speed position P2 or the high speed position P3.

When the operator switch 12 is shifted to the low speed position P2 or the high speed position P3, by connecting the battery 27 to the electromagnetic coil 28a of the switching relay 28 via the operator switch 22 and energizing the electromagnetic coil 28a, the positive terminal 27a of the battery 27 is not connected to the power-side terminal 22 but the power-side terminal 22 is connected to the low potential point 32 between the voltage dividing resistors 30 and 31. As a result, when the motor 13 is continuously operated to rotate, voltage smaller than the battery voltage is applied to the power-side terminal 22, the rotary electrode 24 and the switch-side terminal 23 of the rotary switch 15.

Figure 5:
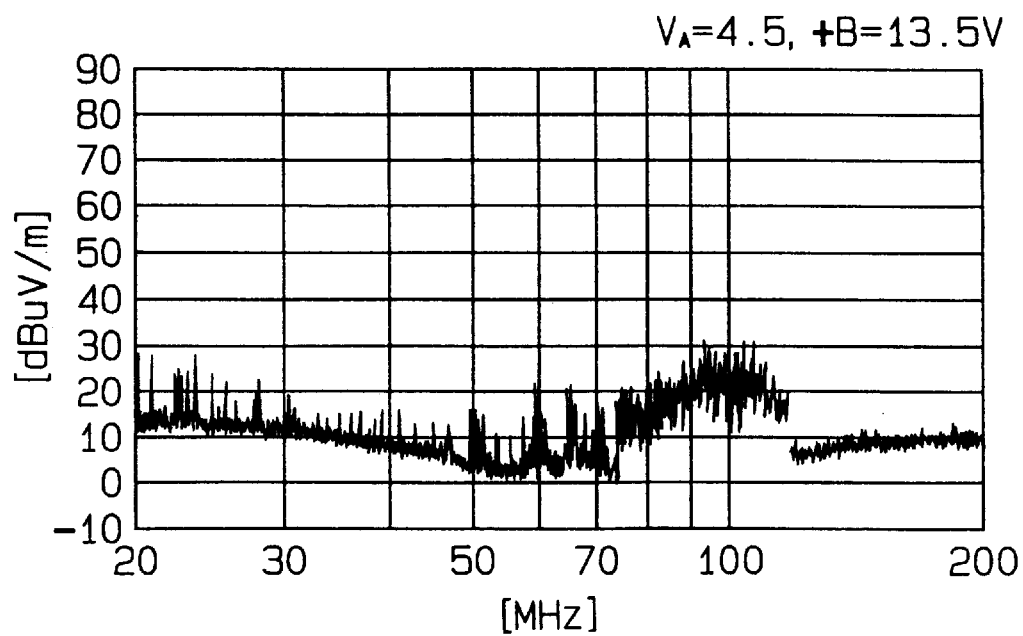
FIG. 5 is a graph showing an electric field intensity-frequency characteristic of the motor control apparatus according to the second embodiment.
Figure 6:
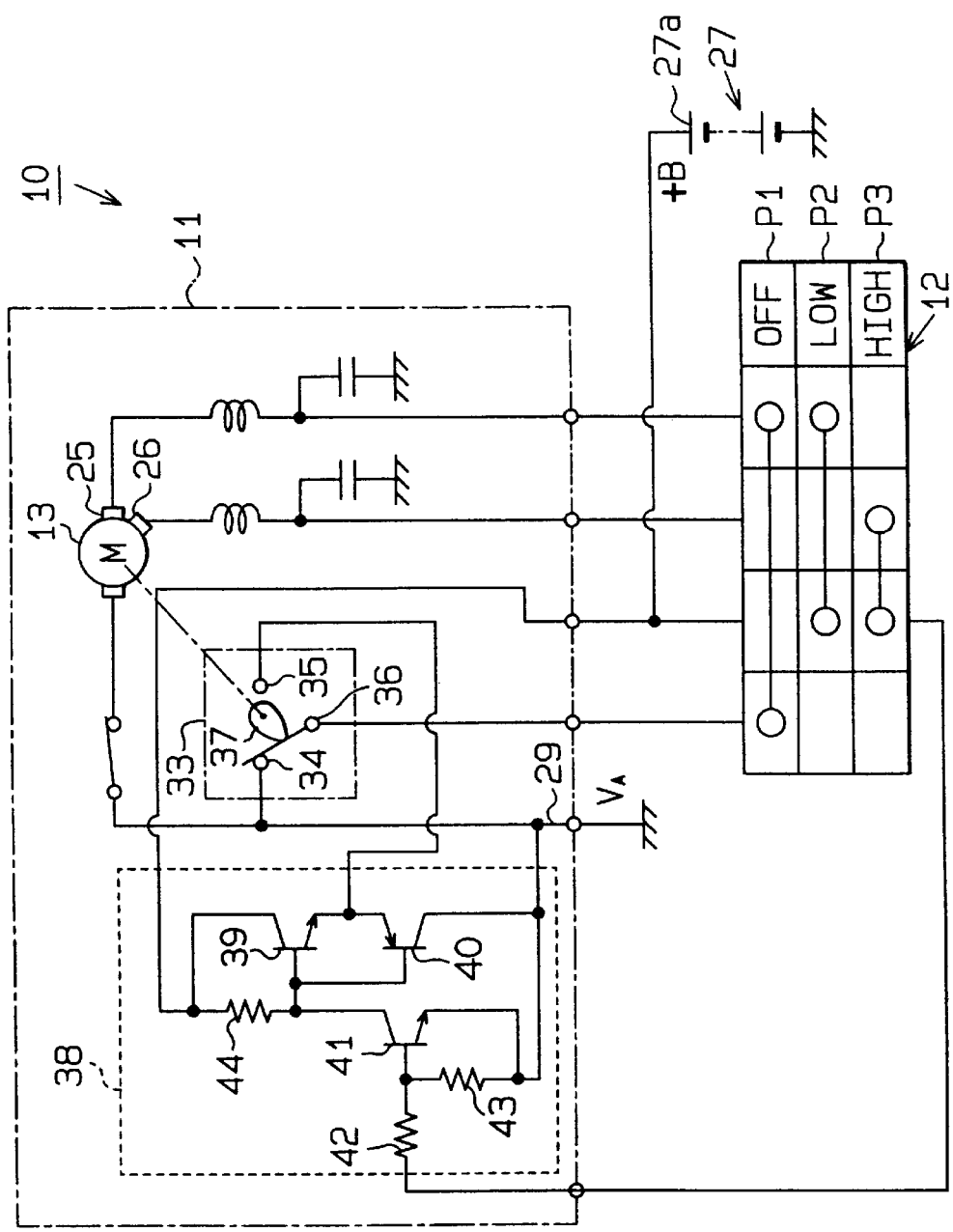
FIG. 6 is a circuit diagram of a motor control apparatus for a wiper apparatus according to a third embodiment of the invention.

FIG. 5 is a graph showing electric field intensity-frequency characteristics of electromagnetic wave generated in operating the motor control apparatus 10 for the wiper apparatus according to the embodiment. The electric field intensity-frequency characteristics of electromagnetic wave are measured under the condition in which 13.5 V is applied to the motor as the battery voltage +B. FIG. 5 is the characteristic when the potential VA of the low potential point 32 is set to 4.5 V. Accordingly, the generated noise, shown in FIG. 4, is significantly restrained in comparison with the characteristic of the conventional motor control apparatus shown in FIG. 3B, (Third Embodiment)

Next, an explanation will be given of a third embodiment embodying the present invention to a motor control apparatus for a wiper apparatus similar to the first embodiment in reference to FIG. 6. Further, the embodiment differs from the first embodiment only in that the rotary switch 15 is replaced by a cam switch 33 and the switching relay 28 is replaced by a switching circuit 38 having a pair of transistors 39 and 40. Therefore, the same notations are attached to constitutions the same as those in the first embodiment, an explanation thereof will be omitted and a description will be given only to the cam switch 33 and the switching circuit 38 in details.

There is provided the cam switch 33 inside the housing. The cam switch 33 is provided with a ground-side contact 34 as a ground side fixed contact grounded to the housing, a power-side contact 35 as a power-side contact, a switch-side terminal 36 as a movable switch contact and a cam 37. Further, according to the cam switch 33, the cam 37 operationally connected to the worm wheel 18 to cooperate with the worm wheel 18, switches to connect the switch-side terminal 36 to the ground-side contact 34 or the power-side contact 35 with one rotational motion of the output shaft 16 as one period. When the switch-side terminal 36 is connected to the ground-side contact 34, power is not supplied to the motor. On the other hand, when the switch-side terminal 36 is connected to the power-side contact 35, power is supplied to the motor.

The switching circuit 38 is provided inside the housing to prevent the battery voltage from being applied to the cam switch 33 when the operator switch 12 is shifted to the low speed position P2 or the high speed position P3.

The switching circuit 38 includes the NPN transistor 39 and the PNP transistor 40 of a bipolar type as semiconductor switching elements. The transistors 39 and 40 are controlled by the battery 27 connected thereto via the operator switch 12 when it is shifted to the low speed position P2 or the high speed position P3. Accordingly, the power-side contact 35 is connected to the battery 27 or the ground line 29 by the transistors 39 and 40.

The base of the NPN transistor 41 is connected to the low speed position P2 and the high speed position P3 of the operator switch 12 via a resistor 42 and the emitter thereof is connected to the ground line 29 via a resistor 43. The collector of the NPN transistor 41 is connected to the positive terminal 27a of the battery 27 via a resistor 44. The base of the NPN transistor 39 is connected to a joint portion of the collector of the NPN transistor 41 and the resistor 44, the emitter thereof is connected to the power-side contact 35, and the collector thereof is connected to the positive terminal 27a of the battery 27. The base of the PNP transistor 40 is connected to the base of the NPN transistor 39, the emitter thereof is connected to the power-side contact 35, and the collector thereof is connected to the ground line 29.

When the operator switch 12 is located at the OFF position P1, the NPN transistor 41 is not connected to the battery 27 and is turned off, the NPN transistor 39 is turned off and the PNP transistor 40 is turned on. Then, the power-side contact 35 of the cam switch 33 is connected to the battery 27.

When the operator switch 12 is located at the OFF position P1, and the switch-side terminal 36 is connected to the ground-side contact 34, the battery 27 connected to the power-side terminal 35 via the NPN transistor 39 of the switching circuit 38, is not connected to the motor 13 via the operator switch 12. Therefore, the motor 13 is not operated to rotate, the cam 37 is not operated by the rotational motion of the worm wheel 18 and accordingly, the switch-side terminal 36 stays connected to the ground-side contact 34. In other words, when the operator switch 12 is located at the OFF position P1, the motor 13 stays still at a rotational position at which the switch-side terminal 36 is connected to the ground-side contact 34 by the cam 37 cooperating with the worm wheel 18. That is, the wiper blade stops at the stop position.

When the operator switch 12 is operated to switch from the OFF position P1 to the low speed position P2 or the high speed position P3, the battery 27 is connected directly to the brush 25 for low speed drive or the brush 26 for high speed drive via the operator switch 12. As a result, the motor 13 is operated to rotate continuously at a low speed or a high speed.

At this occasion, the NPN transistor 41 is turned on, the NPN transistor 39 is turned off and the PNP transistor 40 is turned on. Then, the battery 27 is not connected to the power-side terminal 35 of the cam switch 33 and the power-side terminal 35 is connected to the ground line 29. When the motor 13 is operated to rotate continuously, the power-side terminal 35 of the cam switch 33 is not applied with the battery voltage but is brought into the ground potential.

When the operator switch 12 is shifted from the low speed position P2 or the high speed position P3 to the OFF position P1, the battery 27 is not connected directly to the brush 25 for low speed drive and the brush 26 for high speed drive of the motor 13. The NPN transistor 41 is not connected to the battery 17 and is turned off, the NPN transistor 39 is turned on and the PNP transistor 40 is turned off. Therefore, the power-side terminal 35 of the cam switch 33 is connected to the battery 27.

When the operator switch 12 is located at the OFF state P1, and the rotational position of the worm wheel 18 is located at a rotational position at which the switch-side terminal 36 is connected to the power-side contact 35, the battery 27 is connected to the operator switch 12 via the cam switch 33 and is connected from the operator switch 12 to the brush 25 for low speed drive of the motor 13. Then, the battery 27 is connected to the brush 25 for low speed drive. via the NPN transistor 39, the cam switch 33 and the operator switch 12 and the motor 13 is operated at a low speed.

When the worm wheel 18 is located at the rotational position so that the switch-side terminal 36 is connected to the ground-side contact 34, the power-side terminal 35 is not connected to the operator switch 12. Then, electric current is not supplied from the battery 27 to the brush 25 for low speed drive, and the motor 13 stops.

When the operator switch 12 is shifted from the low speed position P2 or the high speed position P3 to the OFF position P1, the motor 13 rotates until the worm wheel 18 reaches the predetermined rotational position at which the switch-side terminal 36 is connected to the ground-side terminal 34 and thereafter, the motor 13 stops.

Therefore, while the motor 13 is operated continuously, the power-side terminal 35 is not applied with the voltage of the battery 27 and is brought into the ground potential and accordingly, the contact potential difference between the power-side contact 35 and the switch-side terminal 46 is significantly reduced or substantially eliminated.

(Fourth Embodiment)

Figure 7:
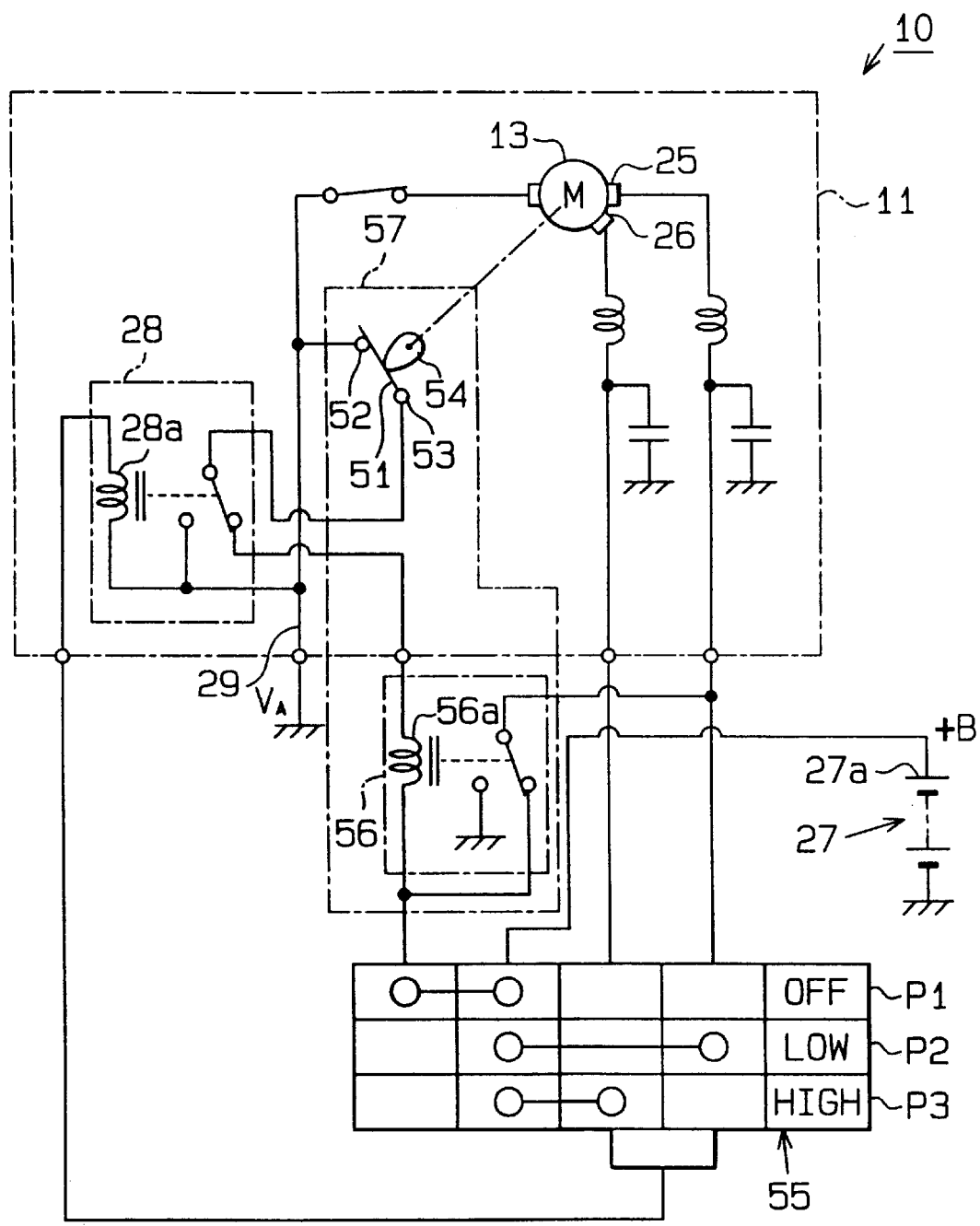
FIG. 7 is a circuit diagram of a motor control apparatus for a wiper apparatus according to a fourth embodiment of the invention.

Next, an explanation will be given of a fourth embodiment embodying the present invention in a motor control apparatus for a wiper apparatus similar to the first embodiment 25 in reference to FIG. 7. Further, the embodiment differs from the first embodiment in that the operator switch 12 is replaced by an operation switch 55 and the rotary switch 15 is replaced by a microswitch 51 and a relay 56 for the automatic stop. Therefore, the same notations are attached to constitutions the same as those in the first embodiment, an explanation thereof will be omitted and a detailed description will be given only to the operator switch 55, the microswitch 51 and the relay 56 for automatic stopping.

The microswitch 51 as a rotary switch is provided at inside of the housing. The microswitch 51 is provided with a ground side contact 52 grounded to the housing and a switch-side terminal 53 as a switch contact and a movable terminal. A cam 54 is operationally engages the worm wheel 18 so that the microswitch 51 connects the switch-side terminal 53 to the ground side contact 52 or cuts connection therebetween with one rotational motion of the output shaft 16. Further, the microswitch 51 is turned off when the switch-side terminal 53 is connected to the ground side contact 52 and is turned on when the switch-side terminal 53 is not connected to the ground side terminal 52.

The operator switch 55 is respectively connected with the positive terminal 27a of the battery 27 and the brush 25 for low speed drive and the brush 26 for high speed drive of the motor 13. The operator switch 55 is connected with the switch-side terminal 53 via the switching relay 28 and the automatic stopping relay 56. The operator switch 55 can be operated to switch to any one of the OFF position P1, the low speed position P2 and the high speed position P3. At the OFF position P1, the operator switch 55 connects the switch-side terminal 53 to the brush 25 for low speed drive of the motor 13. Further, the operator switch 55 connects the positive terminal 27a of the battery 27 directly to the brush 25 for low speed drive at the low speed position P2 and connects the positive terminal 27a directly to the brush 26 for high speed drive at the high speed position P3.

While the operator switch 55 is located at the position P1 and if the switch-side terminal 53 and the automatic stopping relay 56 are connected by the switching relay 28, the automatic stopping relay 56 is controlled by the microswitch 51 to connect the positive terminal 27a of the battery 27 to the brush 25 for low speed drive of the motor 13 when the switch-side terminal 53 is not connected to the ground-side contact 52. The automatic stopping relay 56 separates the positive terminal 27a from the brush 25 when the switch-side terminal 53 is connected to the ground side contact 52.

In other words, the automatic stopping relay 56 is provided with an electromagnetic coil 56a energized when the battery 27 is connected via the operator switch 55 to the switch-side terminal 53 via the switching relay 28. When the electromagnetic coil 56a is not energized, the automatic stopping relay 56 connects the positive terminal 27a of the battery 27 connected to the operator switch 55 to the brush 25 for low speed drive and does not connect the positive terminal 27a to the brush 25 for low speed drive when the electromagnetic coil 56a is energized.

Further, according to the embodiment, the microswitch 51 and the automatic stopping relay 56 constitute a rotary switch 57.

The switching relay 28 is connected between the operator switch 55 and the switch-side terminal 53 and is operated when the operator switch 55 is shifted. The switch-side terminal 53 is connected to the positive terminal 27a while the operator switch 55 is located at the OFF position P1, and it is not connected to positive terminal 27a, but the is connected to the ground line 29 while the operator switch 55 is located at the low speed position P2 or the high speed position P3.

That is, the switching relay 28 is provided with the electromagnetic coil 28a operated by the operator switch 55 when it is shifted to the low speed position P2 or the high speed position P3. The switching relay 28 connects the switch-side terminal 53 to the operator switch 55 via the automatic stopping relay 56 when the electromagnetic coil 28a is deenergized and connects the switch-side terminal 53 to the ground line 29 when the electromagnetic coil 28a is energized.

Further, when the operator switch 55 is shifted to the OFF position P1, there is constituted a first circuit in which the battery 27 is connected to the motor 13 via the automatic stopping relay 56 of the power supply switch 57 and power is supplied to the motor 13 when the switch-side terminal 53 is not connected to the ground side contact 52. In the meantime, the first circuit is cut when the switch-side terminal 53 is connected to the ground side contact 52. Further, when the operator switch 12 is shifted to the low speed position P2 or the high speed position P3, there is constituted a second circuit in which the battery 27 is connected to the motor 13 without interposing the automatic stopping relay 56 of the rotary switch 57.

In summary, when the operator switch 55 is shifted from the low speed position P2 to the OFF position P1, the electromagnetic coil 28a of the switching relay 28 is energized and the positive terminal 27a of the battery 27 connected to the operator switch 55 and the switch-side terminal 53 are connected by the switching relay 28. When the worm wheel 18 is located at the rotational position where the switch-side terminal 53 is not connected to the ground side terminal 52, the automatic stopping relay 56 connects the positive terminal 27a of the battery 27 to the brush 25 for low speed drive of the motor 13. Then, the battery 27 is connected to the motor 13 via the operator switch 55 and the automatic stopping relay 56 and the motor 13 is operated at a low speed.

When the switch-side terminal 53 is connected to the ground side contact 52 by the cam 54 by rotational motion of the worm wheel 18, the battery 27 is connected to the electromagnetic coil 56a of the automatic stopping relay 56, the electromagnetic coil 56a is energized and the automatic stopping relay 56 does not connect the battery 27 connected to the operator switch 55 to the motor 13. Then, the battery 27 is not connected to the motor 13 via the operator switch 55 and the automatic stopping relay 56 and the motor 13 stops operating.

When the operator switch 55 is shifted to the low speed position P2 or the high speed position P3, the electromagnetic coil 28a of the switching relay 28 is energized, the battery 27 connected to the operator switch 55 is not connected to the switch-side terminal 53 and the switch-side terminal 53 is connected to the ground line 29.

(Fifth Embodiment)

Next, an explanation will be given of a fifth embodiment embodying the present invention in a motor control apparatus for a wiper apparatus in reference to FIG. 8. The motor control apparatus for a wiper apparatus according to the embodiment is constituted of a operator switch 58 and the conventional motor unit 11. Further, the same notations are attached to constitutions the same as those in the previous embodiments. An explanation thereof will be omitted and an explanation will be given centering on the operator switch 58.

Figure 8:
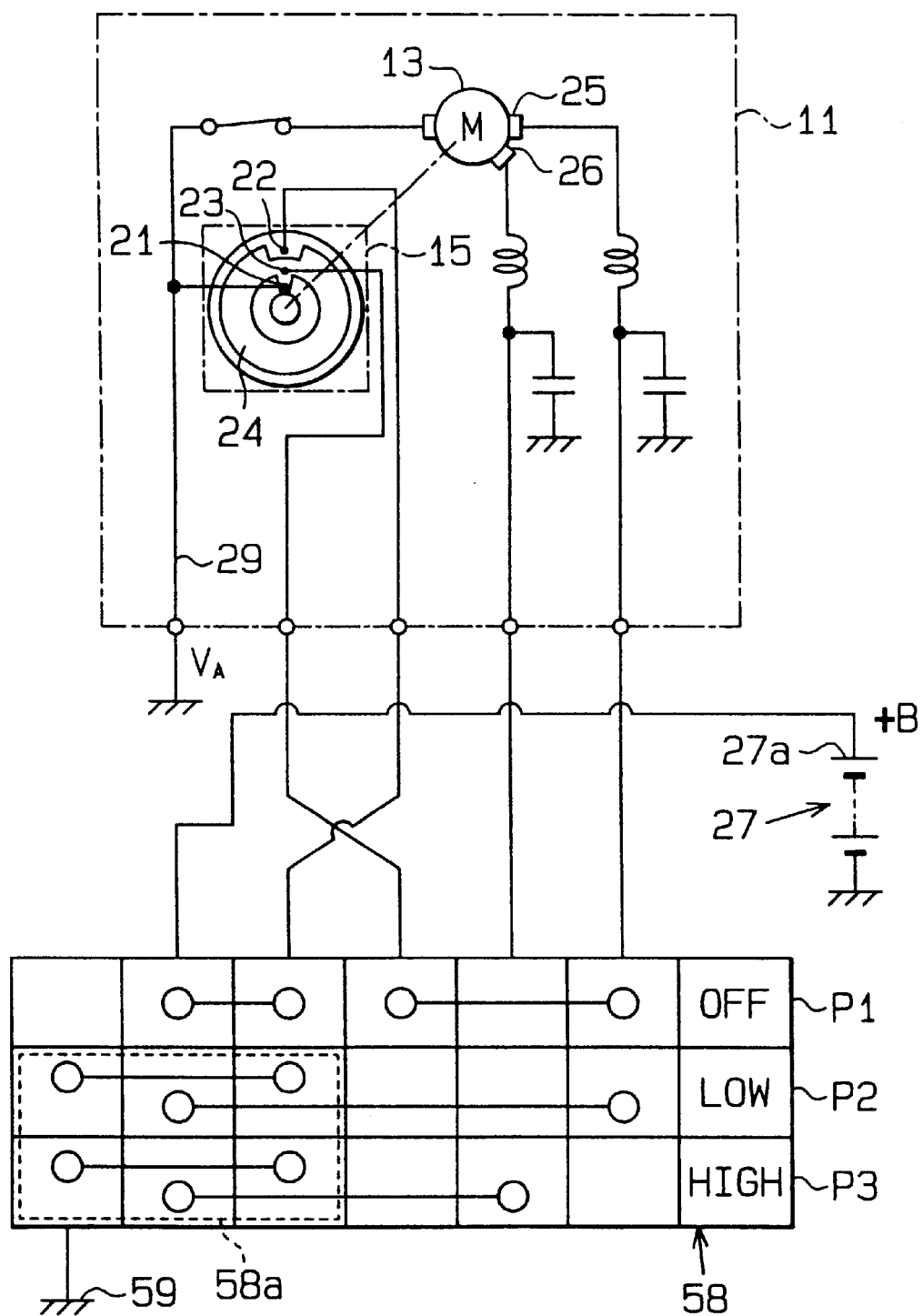
FIG. 8 is a circuit diagram of a motor control apparatus for a wiper apparatus according to a fifth embodiment of the invention.

As shown in FIG. 8, the operator switch 58 is operated to shift to any position of the OFF position P1, the low speed position P2 and the high speed position P3. At the OFF position P1, the operator switch 58 connects the positive terminal 27a of the battery 27 to the power-side terminal 22 and connects the switch-side terminal 23 to the brush 25 for low speed of the direct current motor 13. That is, at the OFF position P1, the connection is carried out in a similar manner to the previous embodiments.

In the meantime, at the low speed position P2, the operator switch 58 connects the positive terminal 27a of the battery 27 directly to the brush 25 for low speed drive of the direct current motor 13 and grounds the power-side terminal 22. That is, the operator switch 58 is provided with a connecting circuit 58a for connecting the power-side terminal 22 to a ground portion 59 when the switch 58 is operated to switch to the low speed position P2 or the high speed position P3.

According to the motor control apparatus for the wiper apparatus constituted in this way, when the operator switch 58 is operated to shift to the low speed position P2 or the high speed position P3, regardless of the rotary switch 15, the battery voltage is applied to the motor 13 via the operator switch 58 and the motor 13 is rotated continuously in one direction.

At this occasion, the power-side terminal 22 in the rotary switch 15 is connected to the ground portion 59 by the connecting circuit 58a and accordingly, contact potential differences between the power-side terminal 22 and the rotary electrode 24 and between the rotary electrode 27 and the switch-side terminal 23 are reduced, further, an amount of electric charge accumulated in the power-side terminal 22, the rotary electrode 24 and the switch-side terminal 23 is reduced.

The present invention may be embodied to a motor control apparatus for other than the wiper apparatus, which is provided with a rotary switch for switching a state of continuously operating a motor.

In a motor control apparatus in which, for example, a planetary gear is used in place of the worm gear as a speed reducing mechanism, a rotating member may be used as a member for detecting rotational position which is provided to cooperate with the motor separately from the speed reducing mechanism.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A motor control apparatus for a motor having a plurality of operation modes comprising:
   a power source;
   a rotary wheel rotatable with said motor;
   a rotary switch for turning on or off according to rotation of said rotary wheel;
   a first circuit including said rotary switch and connected to said motor, for supplying electric power to said motor via said rotary switch when connected to said power source via said rotary switch;
   a second circuit that is connectable to said motor, and that bypasses said rotary switch, for supplying electric power to said motor when connected to said power source;
   an operator switch having a first position for connecting said first circuit to said power source and a second position for connecting said second circuit to said power source; and
   means, connected to said rotary switch, for reducing electric potential thereof when said operator switch is positioned at said second position.

2. The motor control apparatus as claimed in claim 1, wherein
   said means has a grounding member for grounding said rotary switch when said operator switch operates said second circuit.

3. The motor control apparatus as claimed in claim 1, wherein said rotary switch comprises a pair of contact members opening or closing according to rotation of said rotary wheel.

4. The motor control apparatus as claimed in claim 1, wherein said rotary switch comprises a cam fixed to said rotary wheel and a pair of contact members fixed to said motor to be opened or closed by said cam.

5. The motor control apparatus as claimed in claim 3, wherein
   said means has a grounding member for grounding one of said contact members when said operator switch operates said second circuit.

6. The motor control apparatus as claimed in claim 3, wherein
   said means has a voltage dropping circuit.

7. The motor control apparatus as claimed in claim 3, wherein
   said means has a voltage dividing circuit.

8. The motor control apparatus as claimed in claim 5, wherein
   said means has a switch for connecting said grounding member to said pair of contact members when said operator switch operates said second circuit.

9. The motor control apparatus as claimed in claim 6, wherein
   said means has a switch for connecting said voltage dropping member to said pair of contact members when said operator switch is operated to connect said second circuit to an electric power source.

10. The motor control apparatus as claimed in claim 7, wherein
    said means has a switch for connecting said voltage dividing member to said pair of contact members when said operator switch is operated to connect said second circuit to an electric power source.

11. A motor control apparatus for a motor comprising:
    a battery;
    a rotary wheel rotatable with said motor;
    a rotary switch having at least a pair of contact members for opening or closing according to said rotary wheel;
    a first circuit, including said rotary switch and connected to said motor, for supplying electric power from said battery to said motor via said rotary switch when connected to said battery;
    a second circuit that is connectable to said motor, and that bypasses said rotary switch, for supplying electric power from said battery to said motor when connected to said battery;
    an operator switch having a first position for connecting said first circuit to said battery and a second position for connecting said second circuit to said battery; and
    means, connected to said rotary switch, for reducing electric potential of said contact members when said operator switch is positioned at said second position.

12. A motor control apparatus for a motor comprising:
a battery;
a speed reduction gear unit having a gear wheel rotatable with said motor;
a rotary switch having a movable contact fixed to said gear wheel and a stationary contact;
a first circuit, including said rotary switch and connected to said motor, for supplying electric power to said motor via said rotary switch when connected to said battery;
a second circuit for bypassing said rotary switch and for supplying electric power to said motor when connected to said battery;
an operator switch for selectively connecting one of said first and second circuits to said battery; and
means, connected to said rotary switch, for reducing electric potential of said rotary switch when said operator switch connects said second circuit to said battery.

13. The motor control switch as claimed in claim 12, wherein
said means comprises a grounding member for grounding said rotary switch when said operator switch operates said second circuit.

14. The motor control apparatus as claimed in claim 13, wherein
said grounding member comprises a switch member connected between one of said movable and stationary contacts and a ground.

15. The motor control apparatus as claimed in claim 12, wherein said means comprises a voltage dropping member and a switch member connected between one of said movable and stationary contacts and said voltage dropping member.

16. A motor control apparatus for a motor having a plurality of operation modes comprising:
a battery;
a rotary wheel rotatable with said motor;
a rotary switch, connected between said rotary switch and said motor, having at least a pair of contact members for opening or closing according to a position of said rotary wheel;
a first circuit, including said rotary switch and connected to said motor, for supplying electric power to said motor via said rotary switch when connected to said battery;
a second circuit for bypassing said rotary switch and for supplying electric power to said motor when connected to said battery;
an operator switch, connected between said battery and said second circuit, for selectively contacting one of said first and second circuits to said battery; and
means, connected to said rotary switch, for controlling electric potential of said contact members according to connection of said operator switch.

17. The motor control apparatus as claimed in claim 16, wherein
said rotary switch comprises a first contact member connected to a battery and a second contact member connected to a ground,
said operator switch comprises a first switch position for connecting said first contact member to said motor and a second switch position for connecting said first contact member to a low potential member lower than a potential of said battery.

18. The motor control apparatus as claimed in claim 17, wherein
said operator switch comprises a relay switch having a pair of terminals respectively connected to said battery and said low potential member.

19. The motor control apparatus as claimed in claim 18, wherein
said relay switch comprises an electromagnetic switch.

20. The motor control apparatus as claimed in claim 18, wherein said relay switch comprises semiconductor switch elements,
wherein
said rotary switch further comprises a rotary contact member selectively connecting said motor to one of said first and second contact members according to position of said rotary wheel.

21. The motor control apparatus as claimed in claim 17, wherein
said rotary switch further comprises a rotary contact member selectively connecting said motor to one of said first and second contact members according to position of said rotary wheel.

22. The motor control apparatus as claimed in claim 16, wherein
said operation switch connects said pair of contact members to said battery,
said rotary switch comprises a first switch member for connecting said battery to said first circuit through said operator switch when said first circuit is operated to supply electric power to said motor and disconnect said battery from said first circuit when said first circuit is operated not to supply electric power to said motor, and
said means is connected between said operator switch and said rotary switch and controlled by said operator switch to connect said battery to said rotary switch when said first circuit is operated and connect said rotary switch to a ground when said second circuit is operated.

23. The motor control apparatus as claimed in claim 22, wherein said first switch member comprises a first electromagnetic relay connected in series to said first circuit, and said second switch member comprises a second electromagnetic relay connected via said operator switch to said battery.

24. The motor as claimed in claim 23, wherein
said rotary switch comprises a microswitch.

25. The motor as claimed in claim 24, wherein
said pair of contact members is disposed opposite a surface of said rotary wheel.

26. The motor as claimed in claim 16, wherein
said means comprises a voltage dividing circuit.

27. A motor control apparatus for a wiper apparatus, said motor control apparatus comprising:
a motor having an output shaft and connected with a power source;
a worm wheel in mesh with a worm fixed to said output shaft;
a rotary switch including a ground-side terminal, a switch-side terminal, a power-side terminal and a rotary switch-side terminal, a power-side terminal and a rotary electrode fixed to said worm wheel to be in sliding contact with said respective terminals in accordance with operating to rotate said worm wheel in accordance with a rotational position of said worm wheel, said power-side terminal connected with said power source;

a operator switch respectively connected with said power source, motor and switch-side terminal, said operator switch being operated to switch to an OFF position for connecting said switch-side terminal to said motor and said power source to an operational position for connecting said power source to said motor; and voltage control means for limiting a voltage applied to said moving contact switch to a voltage lower than said power source voltage when said operator switch is shifted to said operational position.

28. A motor control apparatus for a wiper apparatus, said motor control apparatus comprising:

a power source;

a motor having an output shaft;

a worm wheel in mesh with a worm fixed to said output shaft;

a rotary switch including a ground-side terminal, a switch-side terminal, a power-side terminal and a rotary electrode fixed to said worm wheel to be in sliding contact with said respective terminals in accordance with a rotational position of said worm wheel, said power-side terminal connected with said power source;

an operator switch having an OFF position for connecting said switch-side terminal to said motor and said power source and an operational position for connecting said power source to said motor; and voltage control means for limiting a voltage applied to said moving contact switch to a voltage lower than said power source voltage when said operator switch is in said operational position.

29. The motor control apparatus as claimed in claim 28, wherein said voltage control means comprises a connecting circuit provided in said operator switch for connecting said power-side terminal to a low potential portion when said switch is in said operational position.

* * * * *